(12) United States Patent
Tajima

(10) Patent No.: US 9,321,592 B2
(45) Date of Patent: Apr. 26, 2016

(54) TIMING BELT FOR SUCTION FEEDER

(71) Applicant: Gates Corporation, Denver, CO (US)

(72) Inventor: Hiroaki Tajima, Yamatokoriyama (JP)

(73) Assignee: Gates Corporation, Denver, CO (US)

( * ) Notice: Subject to any disclaimer, the term of this patent is extended or adjusted under 35 U.S.C. 154(b) by 0 days.

(21) Appl. No.: 14/439,572

(22) PCT Filed: Feb. 6, 2013

(86) PCT No.: PCT/JP2013/052681
§ 371 (c)(1),
(2) Date: Apr. 29, 2015

(87) PCT Pub. No.: WO2014/069000
PCT Pub. Date: May 8, 2014

(65) Prior Publication Data
US 2015/0291359 A1    Oct. 15, 2015

(30) Foreign Application Priority Data

Oct. 30, 2012   (JP) .................................. 2012-239368

(51) Int. Cl.
*B65G 15/34*  (2006.01)
*B65G 15/42*  (2006.01)
*B65G 15/58*  (2006.01)
*F16G 1/10*   (2006.01)
(Continued)

(52) U.S. Cl.
CPC ............... *B65G 15/34* (2013.01); *B65G 15/42* (2013.01); *B65G 15/58* (2013.01); *F16G 1/10* (2013.01); *F16G 1/28* (2013.01); *B65G 21/2027* (2013.01)

(58) Field of Classification Search
CPC .............................. B65G 15/42; B65G 15/34
USPC .................. 198/689.1, 834, 844.1, 845, 847; 474/266, 267, 271
See application file for complete search history.

(56) References Cited

U.S. PATENT DOCUMENTS 3,580,767 A * 5/1971 Barnes et al. ........... B29C 70/58
                                              156/138
3,621,727 A * 11/1971 Cicognani .............. B29D 29/08
                                              474/205
3,981,206 A * 9/1976 Miranti, Jr. .......... B29D 29/103
                                              474/238
(Continued)

FOREIGN PATENT DOCUMENTS

JP         58178545 U      11/1983
JP          6163054 U       4/1986
(Continued)

OTHER PUBLICATIONS

US 2015/0158672 A1, Lenser et al. Jun. 11, 2015.*
(Continued)

*Primary Examiner* — Douglas Hess
(74) *Attorney, Agent, or Firm* — Paul N. Dunlap, Esq.; Jeffrey A. Thurnau, Esq.

(57) ABSTRACT

A conveying surface 37 is planar. A driving surface 30 positioned opposite to the conveying surface 37 has a flat surface 31, which extends in the longitudinal direction of the timing belt, on the center portion in the lateral direction of the timing belt. Belt teeth 32 are formed at a constant interval in the longitudinal direction on both of the outer sides of the center portion. The whole of the driving surface 30 is covered with a fabric 36, which is stretchable in both the longitudinal and lateral directions of the timing belt.

7 Claims, 10 Drawing Sheets

(51) Int. Cl.
*F16G 1/28* (2006.01)
*B65G 21/20* (2006.01)

(56) References Cited

U.S. PATENT DOCUMENTS

| | | | | |
|---|---|---|---|---|
| 4,027,545 A * | 6/1977 | White, Jr. | ............... | B29D 29/10 156/138 |
| 4,137,787 A * | 2/1979 | Waugh | ............... | B29D 29/10 156/139 |
| 4,311,474 A * | 1/1982 | Standley | ............... | F16G 1/28 156/137 |
| 4,533,420 A * | 8/1985 | Wetzel | ............... | F16G 1/28 156/138 |
| 5,127,886 A * | 7/1992 | Fujiwara | ............... | F16G 5/20 474/263 |
| 5,171,190 A * | 12/1992 | Fujiwara | ............... | F16G 1/28 139/383 R |
| 5,234,097 A | 8/1993 | Okuyama | | |
| 5,609,243 A * | 3/1997 | Fujita | ............... | B65G 15/34 198/847 |
| 5,730,440 A | 3/1998 | Motooka | | |
| 5,911,307 A * | 6/1999 | Kraft | ............... | B65G 15/64 198/846 |
| 6,092,645 A * | 7/2000 | Wahren | ............... | B32B 7/02 198/821 |
| 6,117,035 A * | 9/2000 | Isshiki | ............... | B29D 29/08 474/204 |
| 6,173,831 B1 * | 1/2001 | Grabscheid | ............... | D21F 3/029 162/351 |
| 6,443,443 B1 * | 9/2002 | Hirth | ............... | B65H 29/242 226/170 |
| 6,561,344 B1 * | 5/2003 | Basse | ............... | B29D 29/06 198/840 |
| 6,605,014 B2 * | 8/2003 | Isshiki | ............... | F16G 1/28 428/172 |
| 6,863,761 B2 * | 3/2005 | Knutson | ............... | B29D 29/08 156/137 |
| 6,868,747 B2 * | 3/2005 | Goser | ............... | F16H 19/06 198/833 |
| 7,424,948 B2 * | 9/2008 | Mol | ............... | B65G 15/42 198/832 |
| 7,445,112 B2 * | 11/2008 | Kropf-Eilers | ............... | B65G 15/34 198/844.1 |
| 7,681,717 B2 * | 3/2010 | DeGroot | ............... | B65G 15/30 198/832 |
| 8,188,384 B2 * | 5/2012 | Verhaar | ............... | G01G 11/003 177/119 |
| 8,286,786 B1 * | 10/2012 | Saxena | ............... | B65G 15/34 198/844.1 |
| 8,464,862 B2 * | 6/2013 | Honeycutt | ............... | B65G 15/08 198/822 |

FOREIGN PATENT DOCUMENTS

| | | |
|---|---|---|
| JP | 6319443 A | 12/1988 |
| JP | 4260516 A | 9/1992 |
| JP | 2008286402 A | 11/2008 |
| JP | 201278120 A | 4/2012 |

OTHER PUBLICATIONS

US 2015/0158673 A1, Lenser et al. Jun. 11, 2015.*
Japanese Patent Office, International Search Report, Mailing date Apr. 9, 2013; International application No. PCT/JP2013/052681.

* cited by examiner

FIG. 12

TABLE 1

| Belt Spec. | | | Example 1 | Example 2 | Comp. Example 1 | Comp. Example 2 | Comp. Example 3 |
|---|---|---|---|---|---|---|---|
| Matrix Rubber | Intermediate Rubber Layer | | — | NBR Thickness 0.2mm (70) | — | — | — |
| | Tooth Rubber | ( ) is Hardness Shore A. | NBR(70) | NBR (70) | Castable Urethane (70) | NBR (70) | NBR (70) |
| | Backing Rubber | | NBR(60) | NBR (60) | Castable Urethane (65) | NBR (60) | NBR (60) |
| | Cord | | E-Glass | E-Glass | Aramid (Kevlar) | E-Glass | E-Glass |
| Fabric | Driving Surface | Tooth Portion (Tooth Bottom Portion) | Special Fabric Stretch. In Both Dir. RFL Process | Special Fabric stretch. In Both Dir. RFL Process | Castable Urethane (Without Fabric) | Normal Fabric RFL Process stretch. In Lateral Dir. | Normal Fabric RFL Process stretch. In Lateral Dir. |
| | | Flat Surface | Special Fabric Stretch. In Both Dir. RFL Process | Special Fabric stretch. In Both Dir. RFL Process | Castable Urethane (Cords Embedded) | NBR Tooth Rubber Cords Exposed (Tooth Surface Grinded) | Normal Fabric RFL Process Stretchable in Lateral Dir. |
| | Structure of Weave | Kinds of Weave | Twill Weave | Twill Weave | / | Twill Weave | Twill Weave |
| | | Weft (Longitudinal Dir.) | Nylon Wooly Finish | Nylon Wooly Finish | / | Nylon Wooly Finish | Nylon Wooly Finish |
| | | Warp (Lateral Dir.) | Nylon Wooly Finish | Nylon Wooly Finish | / | Nylon Filament | Nylon Filament |
| | Stretchability | Longitudinal Dir. /4.0kgf·1inch | 80% | 80% | / | 80% | 80% |
| | | Lateral Dir. /4.0kgf·1inch | 50% | 50% | / | 4% | 4% |

FIG. 13

TABLE 2

| | Belt Performance | | | | | |
|---|---|---|---|---|---|---|
| | ①Abrasion Generation From Belt Flat surface | ②Heat-Generation By Sliding Of Belt Flat Surface | ③Load Of Driving Source Of Timing Belt | ④Suction Property | | ⑤Belt Formability | |
| | | | | Negative Press. (Gauge Press.) (Set Suction Press.-60kPa) | Stability | Flat Surface | Belt Tooth Portion |
| Example 1 | No Abrasion (Dust) | Heat-Generation Small 41°C | Sliding Resis. (Converted Into Tension Force) Small 1000g (9.8N) | -58kPa | Dispersion Small | Small Unevenness (Unevenness Because of Embedded Cords) | Satisfactory |
| Example 2 | No Abrasion (Dust) | Heat-Generation Small 42°C | Sliding Resis. (Converted Into Tension Force) Small 1000g (9.8N) | -60kPa | No Dispersion (Stable) | No Unevenness Flat | Satisfactory |
| Comp. Ex. 1 | Abrasion (Dust) Exist | Heat-Generation Large 65°C | Sliding Resis. (Converted Into Tension Force) Large 2550g (25.0N) | -60kPa | No Dispersion (Stable) | No Unevenness Flat | Satisfactory |
| Comp. Ex. 2 | Abrasion (Dust) Exist | Heat-Generation Medium 50°C | Sliding Resis. (Converted Into Tension Force) Mid 1500g (14.7N) | -58kPa | Dispersion Large | Small Unevenness (Burred Because of Grinding Process Of Tooth Surface) | Satisfactory |
| Comp. Ex. 3 | No Abrasion (Dust) | Heat-Generation Small 41°C | Sliding Resis. (Converted Into Tension Force) Small 1000g (9.8N) | -50kPa | Dispersion Large | Large Unevenness | Poor (Rounded Tooth) |

TIMING BELT FOR SUCTION FEEDER

TECHNICAL FIELD

The present invention relates to a packaging machine for supplying contents to a pillow-shaped film pouch, and more particularly, relates to a timing belt for a suction feeder, used for conveying film which is shaped in a cylindrical form.

BACKGROUND ART

Conventionally, such a packaging machine is constructed in such a manner that a cylindrical film pouch can be conveyed while maintaining its cylindrically inflated state so that contents such as cakes can be filled therein. In order to perform such a conveying process, a pair of timing belts is disposed along the conveying direction of the cylindrical film pouch, and these timing belts are formed with suction holes so that a negative pressure is applied in order to suck and inflate the cylindrical film pouch. As a timing belt provided with suction holes, one disclosed in Patent Document 1 is known, in which the suction holes are formed in a flat area of the central portion of the timing belt, in which belt teeth are not formed, for example.
PATENT DOCUMENT 1: Unexamined Utility Model Publication No. (HEI) 7-38021

SUMMARY OF THE INVENTION

Problem to be Solved by the Invention

For forming the flat area at the central portion of the timing belt in order to form the suction holes, usually, a method is adopted, in which belt teeth of the central portion are shaved off. However, due to such a machining, a layer such as rubber, urethane, or cords is exposed in the flat area. In a timing belt, a surface on which belt teeth are formed is not only engaged with a drive pulley, but also slidingly contacted with a suction chamber for sucking the cylindrical film pouch toward the belt. Therefore, in the flat area in which the rubber and so on is exposed, not only does a problem occur in which wear debris capable of contaminating the packing machine is generated due to the friction with the suction chamber while running of the timing belt, but another problem also occurs in which sliding resistance becomes large enough to generate heat, and a load of a motor, which is a power source, becomes high to increase the electrical consumption.

The object of the invention is to provide a timing belt for a suction feeder, in which wear debris is not generated and sliding resistance is suppressed as much as possible to prevent the generation of heat, so that the load of the power source can be reduced.

Means for Solving the Problems

The suction feeder timing belt according to the present invention has a feature which comprises a planar conveying surface; a driving surface positioned opposite to the conveying surface, with the driving surface having a flat surface extending in the longitudinal direction of the timing belt at the center portion in the lateral direction of the timing belt, and the driving surface having belt teeth formed at a constant interval in the longitudinal direction on both of the outer sides of the center portion; and a fabric covering the whole of the driving surface, with the fabric being stretchable in both the longitudinal and lateral directions of the timing belt.

Preferably, a cord is embedded in tooth rubber forming the driving surface, and an intermediate rubber layer is provided between the fabric and the cord. Due to the intermediate rubber layer, flatness of the flat surface is ensured in spite of the provision of the cords.

The fabric is a woven fabric, for example. The stretch ratio of the fabric is greater than or equal to 35% in the longitudinal direction, for example, and the stretch ratio of the fabric is greater than or equal to 10% in the lateral direction, for example. Preferably, the stretch ratio of the fabric is greater than or equal to 80% in the longitudinal direction, and the stretch ratio of the fabric is greater than or equal to 50% in the lateral direction.

Preferably, the fabric covers the flat surface, a tooth bottom portion formed between two adjacent belt teeth, a tip portion of the belt tooth, a tooth side portion formed between the tip portion and the tooth bottom portion, and a tooth end portion positioned on the flat-surface side of the belt tooth.

The flat surface is configured with suction holes, which are drilled at a predetermined interval in the longitudinal direction and penetrate through the conveying surface. This is for applying a negative pressure onto an outer surface of the cylindrical film pouch conveyed by the timing belt.

Effect of the Invention

According to the suction feeder timing belt of the present invention, wear debris is not generated and sliding resistance is suppressed as much as possible to prevent the generation of heat when being used in a packaging machine which feeds a packaging film pouch. Further, not only can the load of the power source be reduced, but also a stable negative pressure is always generated. Furthermore, since the fabric has elasticity both in the longitudinal direction and the lateral direction of the timing belt, adhesiveness of the fabric with respect to the tooth rubber is improved, by which the fabric is prevented from separating in an early stage, and is prevented from being imperfectly molded.

BRIEF DESCRIPTION OF THE DRAWINGS

FIG. 12 is a table indicating specifications of the timing belt in the example and the comparative example.

FIG. 13 is a table indicating an experiment result using the example and the comparative example.

EXPLANATION OF REFERENCES

Figure 1:
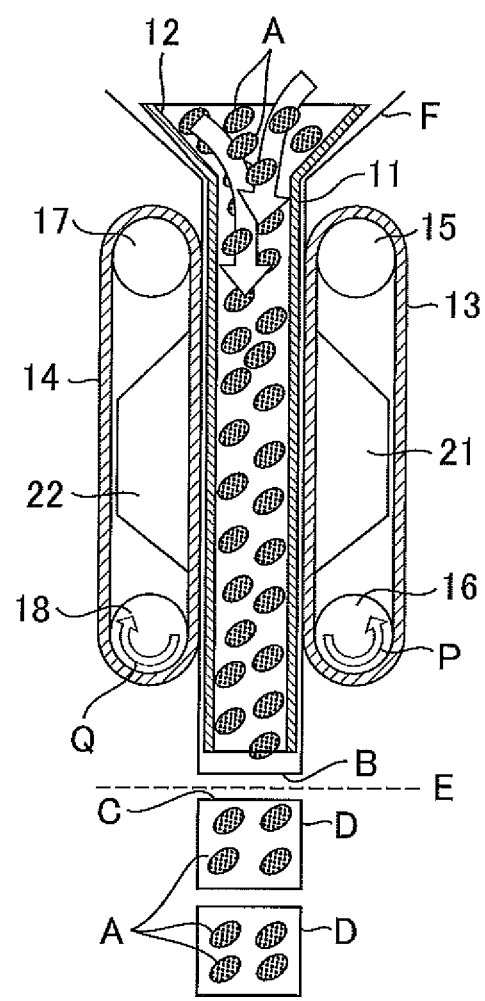
FIG. 1 is a view illustrating a general construction of a packaging machine, which uses the suction feeder timing belt, which is an embodiment of the present invention.

30: driving surface
31: flat surface

32: belt teeth
36: fabric
37: conveying surface
41: tooth rubber
42: backing rubber
45: intermediate rubber layer

EMBODIMENT OF THE INVENTION

In the following, a timing belt for a suction feeder, which is an embodiment of the present invention, will be described with reference to the drawings.

FIG. 1 shows a general construction of a packaging machine, which uses the timing belt. This packaging machine is configured such that, while forming sheet-shaped film F into a cylinder, contents A such as cakes are supplied to the film pouch F. The lower end B of the cylindrically formed film pouch F is sealed, and under this condition, the contents A are supplied into the cylindrically formed film pouch F. The upper portion C of the cylindrically formed film pouch F, in which the contents A are filled, is sealed and cut at the lower portion of the packaging machine, and the pillow-shaped film pouch D is conveyed to the next process.

A cylindrical guide member 11, extending in vertical direction, is disposed at the center of the packaging machine, and a truncated conical hopper 12 diverging upper side is provided at the upper end of the guide member 11. Endless timing belts 13 and 14 are provided on the both sides of the guide member 11. The timing belts 13 and 14 face the guide member 11 with enough space in between to pass the film F. The timing belt 13 is wound around pulleys 15 and 16, and the timing belt 14 is wound around pulleys 17 and 18. The pulleys 16 and 18 rotate in the directions of the arrows P and Q. Namely, the timing belt 13 and 14 rotate such that the sides of the guide member 11 move downward in the drawing.

A suction chamber 21 is provided between the pulleys 15 and 16, and is in contact with a flat surface of the inner surface (driving surface) of the timing belt 13. Similarly, a suction chamber 22 is provided between the pulleys 17 and 18, and is in contact with the inner surface of the timing belt 14. The suction chambers 13 and 14 are connected to a negative pressure source (not shown). The timing belts 13 and 14 are formed with suction holes (not shown), so that a negative pressure occurring in the suction chambers 21 and 22 is applied to the film F through the suction holes.

The film F is sheet-shaped above the hopper 12, and is deformed into a cylinder covering the outer surface of the guide member 11 by a forming machine (not shown). Edge portions of the film F, along the axis of the guide member 11, are adhered to each other, and the lower end B is sealed. In this process, the cylindrical shape of the film F is kept due to the negative pressure supplied by the suction chambers 21 and 22. The cylindrical film F is conveyed downward by the timing belts 13 and 14, and at the same time, the contents A supplied through the hopper 12 are accumulated in the lower part of the film F. When the film F filled with the contents A moves below the guide member 11, the upper end C is sealed and cut at the position of the broken line E.

Figure 2:
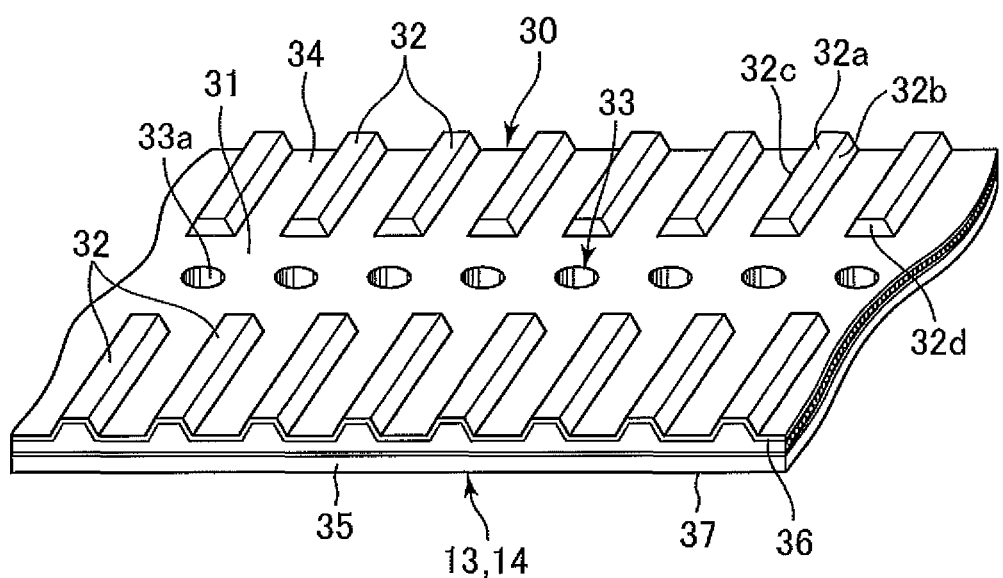
FIG. 2 is a perspective view illustrating a driving surface of the timing belt.

FIG. 2 shows an inner surface or a driving surface 30 of the timing belts 13 and 14. A flat surface 31 is formed extending in the longitudinal direction of the timing belts 13 and 14 at the center portion in the lateral direction of the timing belts 13 and 14. Belt teeth 32 are formed at a constant interval in the longitudinal direction of the timing belt on both of the outer sides of the center portion. The flat surface 31 is configured with suction holes 33. The suction holes 33 are drilled at a predetermined interval in the longitudinal direction and penetrate through the conveying surface 37, which is opposite to the driving surface 30. A tip portion 32a of the belt teeth 32 is an approximately flat surface, and a tooth bottom portion 34 formed between the two adjacent belt teeth 32 is a flat surface slightly greater than the tip portion 32a. Tooth side portions 32b and 32c positioned between the tip portion 32a and the tooth bottom portion 34 are inclined. On the other hand, a tooth end portion 32d positioned at the flat surface 31 side of the belt tooth 32 is vertical to the flat surface 31 (see FIG. 6).

The whole of the driving surface 30 is covered with a fabric 36. Namely, in the driving surface 30, the fabric 36 covers the flat surface 31, the tooth bottom portion 34, the tip portion 32a of the belt teeth 32, the tooth side portions 32b and 32c, and the tooth end portion 32d. In other words, outer side surfaces 35 of the timing belts 13 and 14 and cylindrical inner wall 33a of the suction holes 33 are not covered with the fabric 36, leaving the rubber exposed in those areas.

Figure 3:
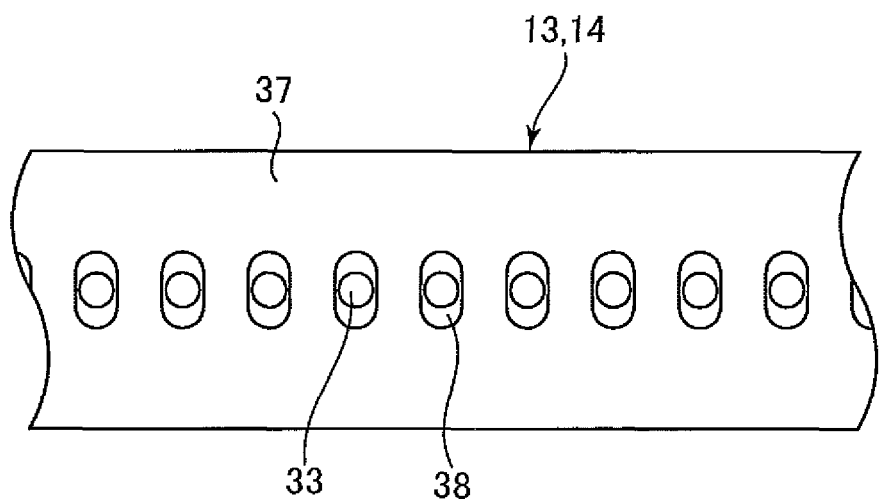
FIG. 3 is a plan view of the timing belt viewed from the conveying surface side.
Figure 4:
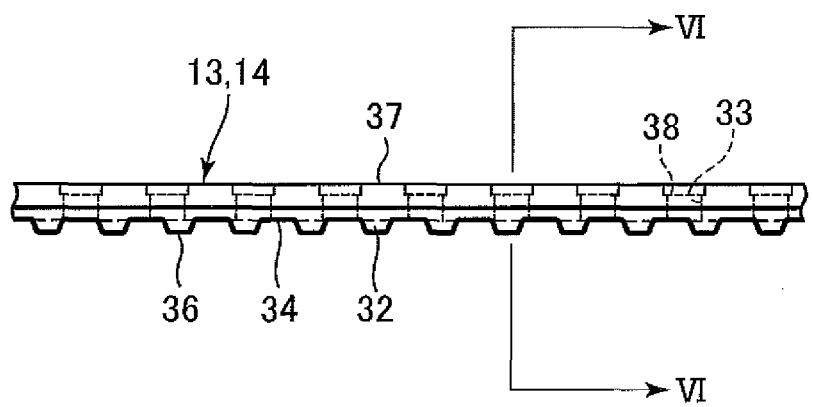
FIG. 4 is a side view of the timing belt.
Figure 5:
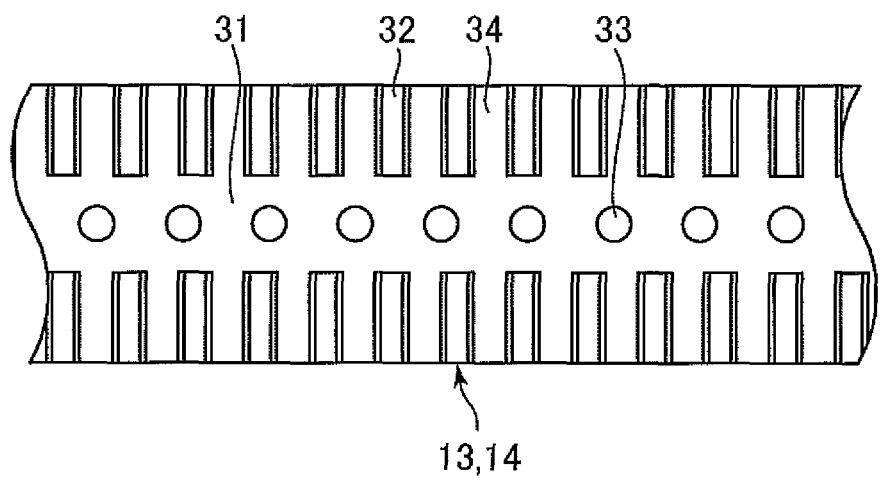
FIG. 5 is a bottom view of the timing belt viewed from the driving surface side.

FIG. 3 is a plan view of the timing belts 13 and 14 as seen from the conveying surface 37 side. FIG. 4 is a side view of the timing belts 13 and 14. FIG. 5 is a bottom view of the timing belts 13 and 14 viewed from the driving surface side. As shown in these drawings, although the conveying surface 37 is flat, an elliptical recess 38 is formed around the suction hole 33, so that the surrounding portion is slightly indented in the conveying surface 37. The suction hole 33 is circular, and is positioned at the center of the recess 38.

Figure 6:
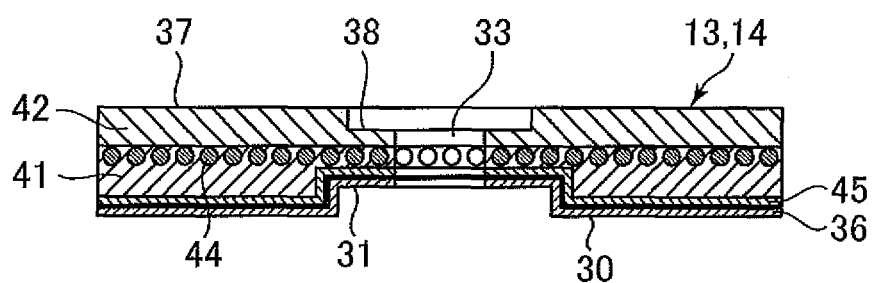
FIG. 6 is a cross-sectional view on VI-VI line of FIG. 4.

With reference to FIGS. 2 and 6, the layered structure of the timing belts 13 and 14 is described below. The tooth rubber 41 forming the driving surface 30 of the timing belts 13 and 14 is NBR rubber, in which the hardness is 74JIS-A, for example. A backing rubber 42 forming the conveying surface 37 is soft NBR rubber, in which the hardness is 61JIS-A, for example. However, depending upon the application, the timing belt may be formed only with tooth rubber, so that one surface of the tooth rubber can be a driving surface, and the other surface of the tooth rubber can be a conveying surface. The fabric 36 is woven fabric or knitted fabric, which is stretchable in both the longitudinal and lateral directions of the timing belts. Glass cords 44 composed of E-glass are provided in the tooth rubber 41, and an intermediate rubber layer 45 is provided between the fabric 36 and the glass cords 44.

When the fabric 36 is a woven fabric, various kinds of woven fabric including plain weave, twill weave or satin weave can be utilized. Regarding warp and weft forming the woven fabric, when both of the warp and the weft are stretchable, the fabric 36 is disposed on the driving surface 30 of the timing belts 13 and 14 such that one of the warp or the weft is aligned in the lateral direction of the timing belts 13 and 14 while the other is aligned in the longitudinal direction. When only one of the warp or the weft is stretchable, or when both of the warp and the weft are not stretchable, the fabric 36 is disposed on the driving surface 30 of the timing belts 13 and 14 such that one of the warp or the weft is aligned in the bias direction with respect to the lateral direction of the timing belts 13 and 14 while the other is aligned in the bias direction with respect to the longitudinal direction of the timing belts 13 and 14.

In the fabric 36, the stretch ratio is different in the lateral direction and the longitudinal direction of the timing belts 13 and 14. As a timing belt for a suction feeder, a trapezoidal tooth profile timing belt of Types XL, L, H and so on is often utilized. The stretch ratio of the fabric 36, in which tensile force of 4.0 kgf per 1-inch width acts on the timing belts 13 and 14 in the lateral direction, is preferably greater than or equal to 10%, and more preferably greater than or equal to 50%. On the other hand, the stretch ratio of the fabric 36, in which tensile force of 4.0 kgf per 1-inch width acts on the timing belts 13 and 14 in the longitudinal direction, is preferably greater than or equal to 35%, and more preferably greater than or equal to 80%.

If the stretch ratio of the fabric 36, in which tensile force of 4.0 kgf per 1-inch width acts on the timing belts 13 and 14 in the lateral direction, is greater than or equal to 10%, and the stretch ratio of the fabric 36, in which tensile force of 4.0 kgf per 1-inch width acts on the timing belts 13 and 14 in the longitudinal direction, is greater than or equal to 35%, the minimum necessary elasticity for forming the belt teeth 32 when manufacturing the belt is obtained, and the flatness of the flat surface 31 is ensured.

If the stretch ratio of the fabric, in which tensile force of 4.0 kgf per 1-inch width acts on the timing belts 13 and 14 in the lateral direction, is greater than or equal to 50%, and the stretch ratio of the fabric 36, in which tensile force of 4.0 kgf per 1-inch width acts on the timing belts 13 and 14 in the longitudinal direction, is greater than or equal to 80%, the necessary and sufficient elasticity for forming the belt teeth 32 when manufacturing the belt is obtained, and the flatness of the flat surface 31 is further improved, by which the serviceable life of the timing belt for a suction feeder is prolonged. Further, a timing belt having such a stretch ratio can be used as a trapezoidal-tooth profile timing belt of Types XH, XXH, and so on.

Conversely, if the stretch ratio of the fabric in the lateral direction of the timing belts 13 and 14 is less than 10%, a part of fabric 36, which covers the tooth end portion 32*d* of the belt teeth 32 and the tip portion 32*a* close to the tooth end portion 32*d*, cannot be formed sufficiently along the shape of the metal mold when manufacturing the belt. If the stretch ratio of the fabric in the longitudinal direction of the timing belts 13 and 14 is less than 35%, a part of fabric 36, which covers the tooth side portions 32*b* and 32*c* of the belt teeth 32 and the tip portion 32*a* close to the tooth side portions 32*b* and 32*c*, cannot be formed sufficiently along the shape of the metal mold when manufacturing the belt. In both the cases, imperfect molding of the belt teeth 32, and poor quality, in which the tooth rubber 41 passes through the fabric 36 and exudes onto a surface of the belt teeth 32, will occur. Further, if the fabric 36 covering the flat surface 31 and the tooth bottom portion 34 is drawn in a belt-lateral direction or a belt-longitudinal direction when manufacturing the belt, the adhesive property of the fabric 36 with respect to the tooth rubber 41 can be lowered, so that the fabric 36 becomes separated from the tooth rubber 41 at an early stage of usage of the belt, or the flatness of the flat surface 31 deteriorates.

As an example of a structure of woven fabric, one of the warp or the weft is wooly yarn of nylon, another is urethane elastic yarn, which is configured by winding nylon yarn around urethane core yarn. As the other example, both of the warp and the weft may be configured using wooly yarn of nylon. Further, both of the warp and the weft may be configured by textured yarn obtained using crimping, Taslan process (trade mark), interlacing process, covering process, or a combination thereof. In case of fabric using filament yarn for one of the warp or the weft, the fabric may be bias-cut so that the fabric can be stretchable in both the longitudinal and lateral directions of the timing belt. Note that the fabric can be reinforced by impregnating RFL process liquid, rubber cement, and so on, in the fabric.

When the fabric 36 is a knit fabric, a weft-knitted fabric and a warp-knitted fabric can be used. As a weft-knitted fabric, various kinds of weft-knitted fabric, including a flat-knitted fabric, a rib-stitched fabric, an interlock-knitted fabric, a purl-stitched fabric, and so on, can be used. On the other hand, as a warp-knitted fabric, a Tricot-knitted fabric, a Russel-knitted fabric, a Milanese-knitted fabric, and so on, can be used. The stretchable property of these knitted fabrics is the same as those of the woven fabric described above.

The intermediate rubber layer 45 can be formed by pressing a rubber sheet onto the fabric 36 to adhere them, or can be formed by coating the fabric 36 with a rubber layer. As another example, the intermediate rubber layer 45 can be configured by winding a rubber sheet around the fabric 36. In any case, the thickness of the intermediate rubber layer 45 is preferably greater than 0.2 mm. According to such a structure, when manufacturing the belt, a load (i.e., winding tension) applied to the fabric surface, which occurs by winding a cord around a jacket attached to the metal mold, can be absorbed by the intermediate rubber layer. Due to this, the load directly acting on the fabric from the cord can be reduced, so that the flatness of the flat surface is improved.

The tooth rubber 41, the backing rubber 42, and the intermediate rubber layer 45 can be made using various kinds of rubber in accordance with their purposes, and may be the same kind of rubber or different kinds of rubbers. The different kinds of rubber that can be used include NBR rubber, HNBR rubber, CR rubber, urethane rubber, fluoro rubber, natural rubber, CSM rubber, EPDM rubber, EPM rubber, SBR rubber, BR rubber, and so on.

The glass cords 44 are overcoat-processed with RFL/rubber cement solution, so that adhesiveness to the tooth rubber 41 is enhanced. The glass cords 44 are positioned close to the tooth bottom portion 34 and the flat surface 31, where the glass cords 44 are covered with the fabric 36. Since the suction holes 33 are formed, there are no cords 44 at the portions corresponding to the suction holes 33. However, a portion of the flat surface 31 between adjacent suction holes 33 is reinforced by the fabric 36, and thereby, the strength of the portion is sufficiently ensured. Note that the cords 44 are not limited to E-glass, instead various kinds of glass fiber such as U-glass can be used. Further, the cords 44 can be configured by aramid fiber, or carbon.

An operation of the timing belt of the present embodiment will be described below. In the feeding process of the film F, the film F is moved, while maintaining its cylindrical shape, by the timing belts 13 and 14. At that time, the timing belts 13 and 14 are moved by the pulleys 15-18 engaging with the belt teeth 32, and the flat surface 31 is slidingly contacted with the suction chambers 21 and 22. However, since the whole of the driving surface is covered with the fabric 36, wear debris is not generated in spite of the sliding contact of the flat surface with the suction chambers 21 and 22. Further, since the sliding resistance on the flat surface 31 is minimized, the load of the driving source of the timing belts 13 and 14 becomes small, and the power consumption is restrained.

Further, in the embodiment, since the intermediate rubber layer 45 is provided, unevenness, which is caused by the shape of the cords 44, is not generated in the flat surface 31, so that the flatness of the flat surface 31 is ensured. Therefore, contact of the flat surface 31 with the suction chambers 21 and 22 is improved, so that the negative pressure (suction pressure) caused by the negative pressure source connected to the suction chambers 21 and 22 is not decreased, and thus, the stable negative pressure is always generated and transmitted to the film F (see FIG. 1).

The shape of the driving surface 30, which the fabric 34 covers, is complicated, and the timing belts 13 and 14 have the flat surface 31 along the longitudinal direction at the central portion, while the belt teeth 32 are formed at a constant interval at both sides of the flat surface 31. As described above, the fabric 36 is stretchable in both the longitudinal and lateral directions of the timing belts 13 and 14. Therefore, the fabric 36 is tightly adhered on the whole surface of the belt teeth 32, and roundness does not occur at corners between the tip portion 32a and the tooth side portions 32b, 32c, a corner between the tip portion 32a and the tooth end portion 32d, a corner between the tip portion 32a and the tooth bottom portion 34, and a corner between the tooth end portion 32d and the flat surface 31. Namely, the adhesiveness of the fabric to the tooth rubber is improved, the fabric does not separate from the rubber, and is prevented from causing imperfect molding.

The backing rubber 42 has preferably a large coefficient of friction for feeding the film F, and is preferably made of material having good abrasion resistance properties. And the surface of the backing rubber 42 has preferably a low surface roughness in order to obtain a large friction force while ensuring the contact area with the film F. Accordingly, the conveying surface 37 is grinded in a manufacturing process to become as close to a mirror surface as possible.

Figure 7:
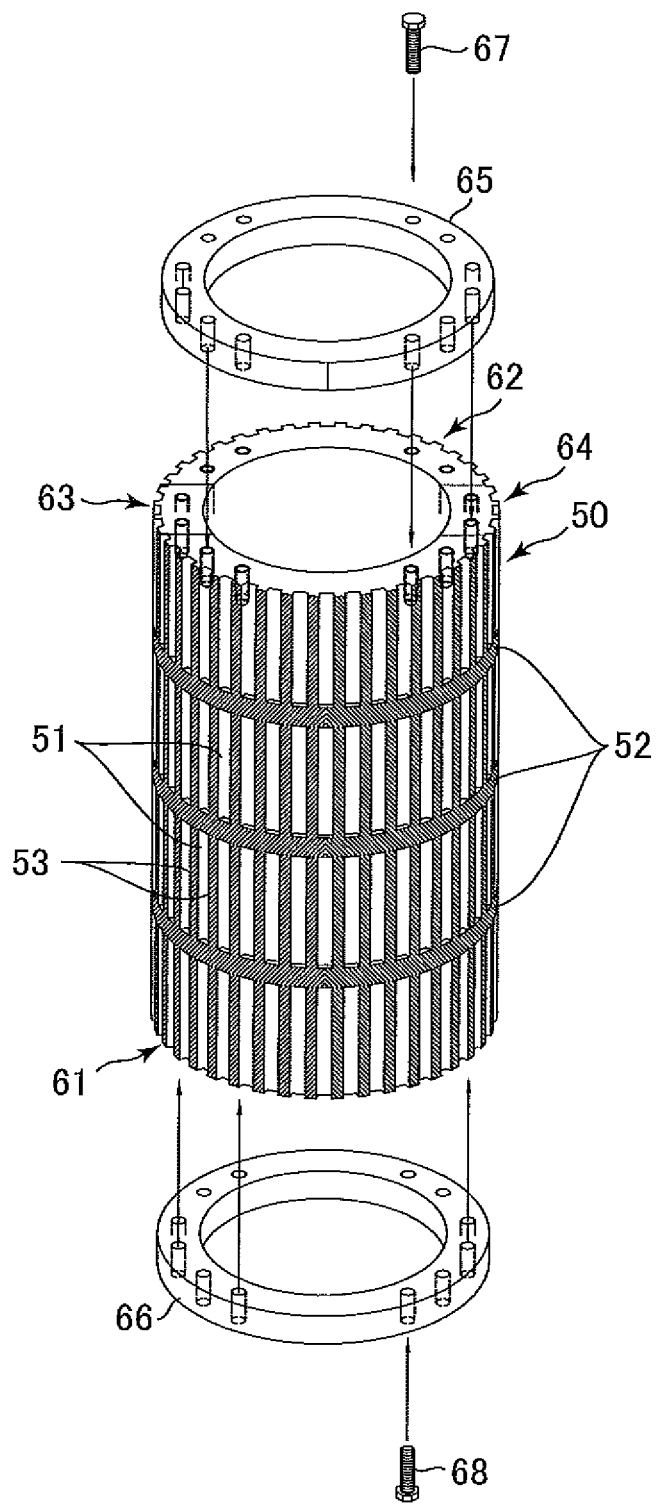
FIG. 7 is a perspective view illustrating a mold.
Figure 8:
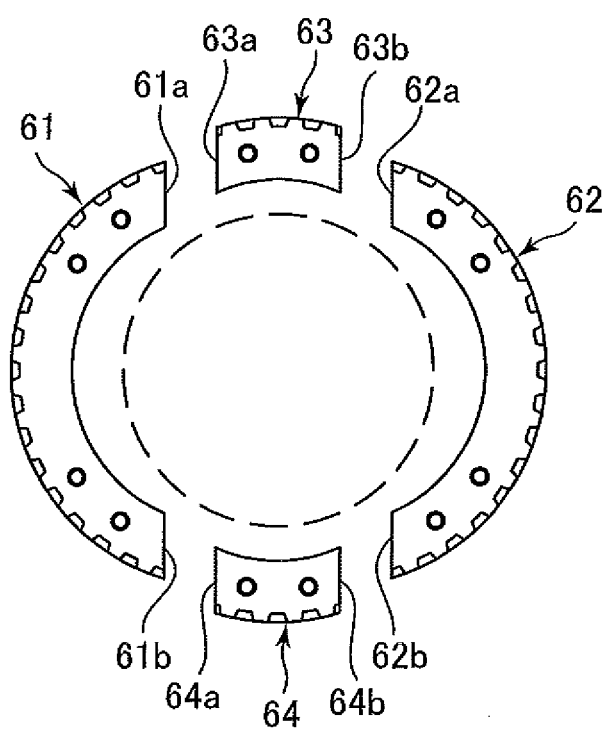
FIG. 8 is a plan view illustrating a disassembled state of a mold body.

With reference to FIGS. 2, 7, and 8, a structure of the metal mold for manufacturing the timing belt is described below.

A metal mold body 50 is cylindrical, and is configured on an outer surface with a number of recessed portions 51 extending in the axial direction and three annular surfaces 52 extending in the circular direction. A rectangular flat portion 53 is formed between the two adjacent recessed portions 51. The recessed portions 51 correspond to the belt teeth 32, and the rectangular flat portion 53 corresponds to the tooth bottom portion 34. The annular surface 52 corresponds to the flat surface 31. The annular surface 52 and the rectangular flat portion 53 are coincident with the cylindrical outer surface, and the recessed portion 51 is indented from the outer surface by the height of the belt tooth 32.

In the embodiment, the metal mold body 50 can be disassembled into four parts as shown in FIG. 8. Namely, the metal mold body 50 is disassembled into a pair of large curved members 61 and 62, and a pair of small curved members 63 and 64. Both end surfaces 61a and 61b of the large curved member 61 is in tight contact with end surfaces 63a and 64a of the small curved members 63 and 64, and both end surfaces 62a and 62b of the other large curved member 62 is in tight contact with the other end surfaces 63b and 64b of the small curved members 63 and 64. Both the end surfaces 61a and 61b of the large curved member 61 are coincident with a flat plane parallel to the axis of the cylindrical metal mold body 50. Similarly, both the end surfaces 62a and 62b of the large curved member 62 are coincident with a flat plane parallel to the axis of the cylindrical metal mold body 50. These flat planes are parallel to each other. Namely, the metal mold body 50 can be disassembled into four parts with the two parallel planes.

In a state in which the large curved members 61 and 62, and the small curved members 63 and 64 are assembled, the upper end of the metal mold body 50 is integrally fixed by a fixing member 65, and the lower end of the metal mold body 50 is integrally fixed by a fixing member 66. The fixing member 65 is an annular member having the same diameter as the metal mold body 50, and attached to the upper end of the metal mold body 50 by screws 67. Similarly, the fixing member 66 is attached to the lower end of the metal mold body 50 by screws 68.

In the manufacturing process of the timing belt, in a state in which the metal mold body 50 is assembled through the fixing members 65 and 66, a fabric formed into a bag is put over an outer surface of the metal mold body 50, around which a rubber sheet (intermediate rubber layer) is wound. Then, a cord is wound around the rubber sheet, and further, material of the tooth rubber is wound over it. An intermediate fabric is wound around them, and after material of backing rubber is wound, a cylindrical bag rubber sheet is put over them. In this state, the metal mold body 50 is put into a vulcanizer, where the metal mold body 50 is heated and pressed. Due to this, the rubber is cured, and the metal mold body 50 is then taken from the vulcanizer.

After cooling the metal mold body 50, the fixing members 65 and 66 are removed from the metal mold body 50. The small curved members 63 and 64 are then displaced inward and removed, the large curved members 61 and 62 are moved inward, and a belt slab in which teeth and so on are formed, is separated from the metal mold body 50 and extracted. The belt slab is cut at a predetermined interval, so that endless timing belts are obtained.

Note that, in the example shown in FIGS. 7 and 8, the metal mold body 50 is disassembled into four parts, but the disassembling structure of the metal mold body 50 is not limited to this. Namely, any structure, by which the belt slab can be extracted can be used, and the number of disassembling parts is unlimited. For example, the number of large curved members may be two, and the number of small curved members may be one.

EXAMPLES

As Examples and Comparative examples, timing belts for a suction feeder were manufactured. Example 1 is shown in FIG. 9(a), in which the tooth rubber 41 is laminated on the backing rubber 42, and the cords 44 are embedded in the tooth rubber 41. In the tooth rubber 41, the flat surface 31 is formed at the center of the cross section, and the belt teeth 32 are formed on both sides. The surface of the tooth rubber 41 is covered with the fabric 36 as a whole. The fabric 36 is a special fabric having stretchable properties in both the longitudinal and lateral directions of the timing belt, similar to the embodiment described above. The details of each part of the timing belt of Example 1 are shown in Table 1 of FIG. 12.

Example 2 is shown in FIG. 9(b), in which the intermediate rubber layer 45 of thickness 0.2 mm is provided between the tooth rubber 41 and the fabric 36. The structures except for the intermediate rubber layer 45 are identical to those of Example 1. Namely, in Example 2, since the intermediate rubber layer 45 is provided, the flatness of the flat surface 31 is high compared to Example 1 where unevenness caused by the existence of the cords 44 can be seen on the flat surface 31, as shown in FIG. 9(a). Note that the details of each part of the timing belt of Example 2 are shown in Table 1.

Comparative example 1 is shown in FIG. 9(c), in which a tooth rubber 72 is laminated on a backing rubber 71, and cords 73 are embedded in the tooth rubber 72. The backing rubber 71 and the tooth rubber are formed by castable-urethane. In the tooth rubber 72, a flat surface 74 is formed at the center of the cross section, and the belt teeth 75 are formed on both sides. The driving surface is not provided with a fabric, but is configured with the tooth rubber 72. The details of each part of the timing belt of Comparative example 1 are shown in Table 1.

Comparative example 2 is shown in FIG. 9(d), in which a surface of the belt teeth 75 is covered with a fabric 76, and the tooth rubber 72 and a part of each cord 73 are exposed on the flat surface 74 due to a grinding process for the tooth surface. As shown in Table 1, the backing rubber 71 and the tooth rubber 72 are NBR rubber, similarly to Examples 1 and 2. The fabric 76 is a normal fabric, which has a sufficient stretchable property in the longitudinal direction of the timing belt, but has little stretchable property in the lateral direction.

Figure 9:
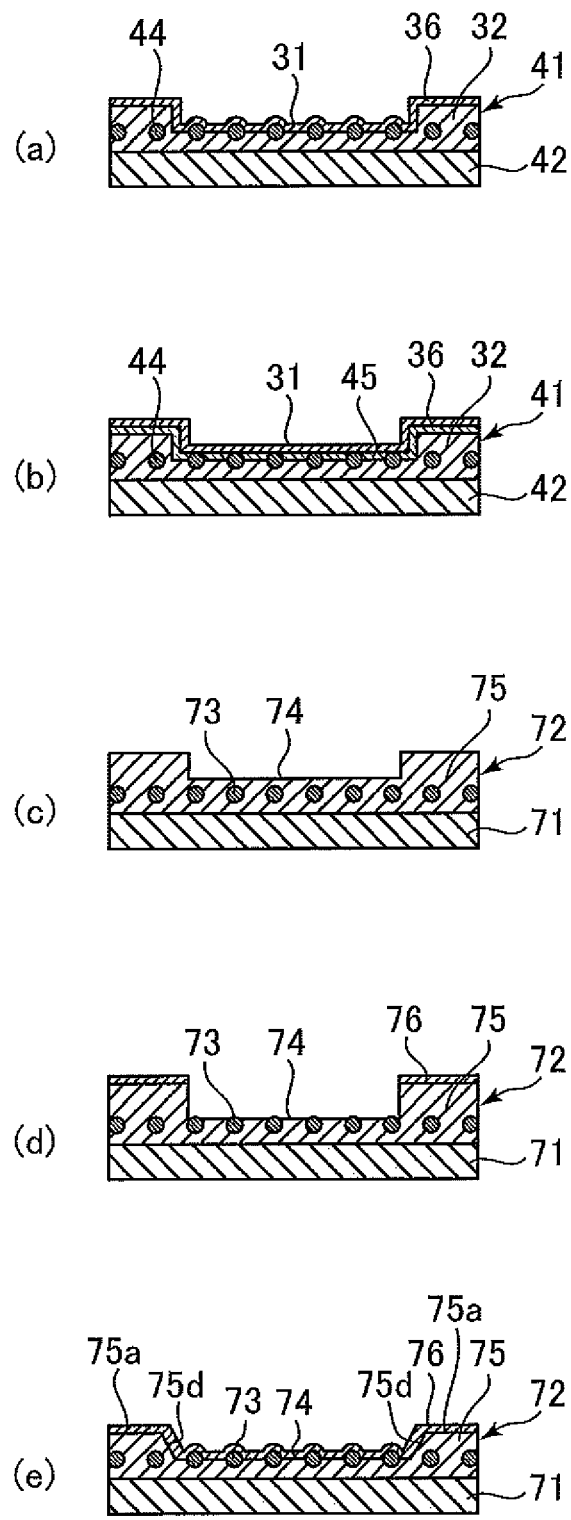
FIG. 9 is a cross-sectional view illustrating an example and a comparative example of the timing belt.

Comparative example 3 has generally the same structure as Example 1, but the structure of the fabric 76 is different. Namely, in Comparative example 3, the fabric 76 is a normal fabric, which has a sufficient stretchable property in the longitudinal direction of the timing belt, but has little stretchable property in the lateral direction, similar to Comparative example 2. As shown in FIG. 9(*e*), the belt tooth 75 has an imperfect molding, in which roundness occurs at a corner between the tip portion 75*a* and the tooth end portion 75*d*, and a corner between the tooth end portion 75*d* and the flat surface 74. Further, in the flat surface 74, the adhesiveness of the fabric to the tooth rubber is reduced, and unevenness caused by the cords 73 can be seen.

A dust-emission/heat-generation test and a sliding resistance test were carried out on the timing belts. Further, the timing belts were mounted on a test machine to conduct a suction test, by which a negative pressure generated in the suction chamber was measured.

Figure 10:
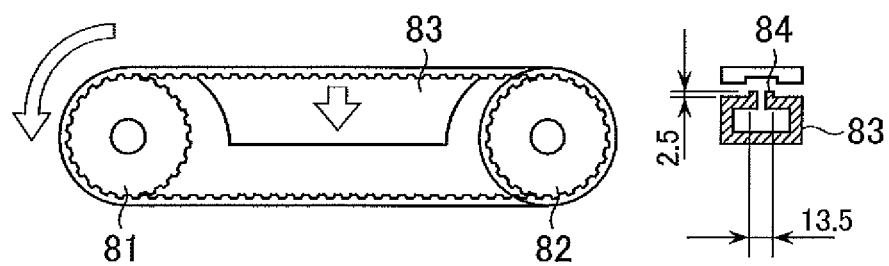
FIG. 10 is a schematic view illustrating a test machine which performs a dust-emission/heat-generation test.

FIG. 10 shows a test machine used in the dust-emission/heat-generation test. This test machine has two pulleys 81 and 82, between which a suction chamber 83 is disposed. A timing belt of the example or the comparative example was wound around the pulleys 81 and 82, and rotated while a negative pressure was generated on the flat surface of the timing belt by the suction chamber 83.

The circumference length of the timing belt was 762 mm, and the width was 38.1 mm, but the suction hole 33 was not formed, different from the embodiment. The shape of the belt tooth was Type L, the pitch was 9.525 mm, the tooth height was 1.91 mm, and the number of teeth was 80. In the pulleys 81 and 82, the number of teeth was 24, and the number of rotations was 500 rpm. The set value (gauge pressure) of the suction pressure at the negative pressure source of the suction chamber 83 was −60 kPa, and the length of the suction chamber 83 (i.e., dimension of the timing belt in the longitudinal direction) was 180 mm. The suction holes 84 of 13.5 mm in width, which corresponds to the 15 mm in width of the flat surface of the timing belt, were formed at the center of the surface of the timing belt side of the suction chamber 83.

After the timing belt was continuously run for one hour while the suction holes 84 of the suction chamber 83 were in contact with the flat surface of the timing belt to absorb the timing belt with the above-described set suction pressure, the temperature of the suction chamber 83 was measured, and the timing belt was then continuously run for 48 hours so that the dust emission conditions around the timing belt and the pulleys could be observed. This test result will be described later.

Figure 11:
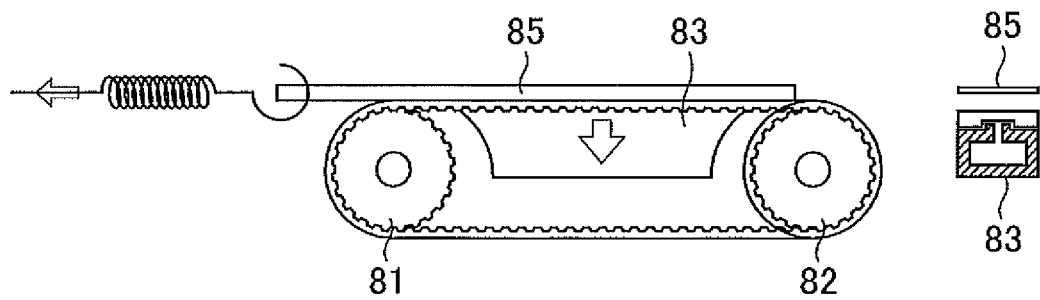
FIG. 11 is a schematic view illustrating a test machine which performs a sliding resistance test.

FIG. 11 shows a test machine which was utilized for the sliding resistance test. While the structures of the pulleys 81 and 82 and the suction chamber 83 were the same as those of the dust-emission/heat-generation test, suction holes were formed at the center of the flat surface of the timing belt in the sliding resistance test. The suction holes were formed with a 19.05 mm pitch along the longitudinal direction of the timing belt, and the diameter of the suction holes was 4 mm. A film 85 was provided on the side of the back surface of the timing belt (the conveying surface 37 in the embodiment), and a force necessary for starting the film 85 to move together with the timing belt was measured. The other test conditions were the same as those of the dust-emission/heat-generation test.

Table 2 shown in FIG. 13 indicates results of the dust-emission/heat-generation test, the sliding resistance test, the suction test, and the formability of the timing belt.

Regarding the dust-emission test, abrasion (or dust) could not be seen both in Examples 1 and 2, and a satisfactory result was obtained. In the heat-generation test, the temperature before the test was 26.7° C., and the temperature after running one hour continuously was 41° C. in both of Examples 1 and 2, which was a satisfactory result. On the other hand, regarding the sliding resistance test, a relatively low sliding resistance of 1000 g (9.8N) was measured in both Examples 1 and 2.

In both the timing belts of Examples 1 and 2, the formability of the belt teeth was satisfactory. In the manufacturing process, the timing belt of Example 1 had unevenness with the same pitch as that of the cords on the flat surface, because of a load (i.e., winding tension) applied to the fabric by the cord during winding of the cord. Conversely, the timing belt of Example 2 did not have unevenness on the flat surface due to the provision of the intermediate rubber layer. Due to the difference of the presence or absence of the unevenness, there was a small difference in the suction property, in which the negative pressure generated in the suction chamber was −58 kPa in Example 1, with variation detected in the measured value, while the negative pressure generated in the suction chamber was −60 kPa in Example 2, without any noticeable variation in the measured value, and thus a stable and very satisfactory result was obtained. Namely, in the timing belt of Example 2, the suction pressure of the negative pressure source supplied by the suction chamber did not decrease, and was transmitted to the timing belt at full pressure.

Conversely, in the timing belt of Comparative example 1, the formability of the belt tooth was satisfactory, the flatness of the flat surface was good, and the suction property showed a similar result as that of Example 2. However, since urethane, in which the coefficient of friction of the flat surface was high, was directly slidingly in contact with the suction holes of the suction chamber, heat was generated by friction, and sliding resistance was large. Namely, the temperature after running continuously for one hour was 65° C., which was too high, and the sliding resistance was 2550 g (25.0N). Further, abrasion (or dust) could be seen, and thus, it was understood that the timing belt was not practical.

Although the timing belt of Comparative example 2 had satisfactory formability of the belt teeth, a part of the cord was exposed on the flat surface due to the grinding process of the tooth surface, and burr was generated on the flat surface. Due to this, the negative pressure generated in the suction chamber was −58 kPa, which was mostly satisfactory, but the negative pressure was largely dispersed and not stable. Namely, although the temperature after running continuously for one hour was 50° C., the sliding resistance was 1500 g (14.7N), which was rather large, and further, abrasion (or dust) could be seen, and thus, it was understood that the timing belt was not practical.

In the timing belt of Comparative example 3, the belt teeth were rounded, and the formability was poor. Further, the timing belt had unevenness with the same pitch as that of the cords on the flat surface, and the unevenness was large. Due to this, the negative pressure generated in the suction chamber was −50 kPa, which was largely dispersed and not stable, and the practicability was poor. Note that the temperature after running continuously for one hour was 41° C., and the sliding resistance was 1000 g (9.8N); both the temperature and the sliding resistance were satisfactory, and abrasion (or dust) could not be seen.

The invention claimed is:

1. A timing belt, which is endless and used for a suction feeder, the timing belt comprising:
   a planar conveying surface;
   a driving surface positioned opposite to the conveying surface, the driving surface having a flat surface extending in the longitudinal direction of the timing belt at the center portion in the lateral direction of the timing belt, the driving surface having belt teeth formed at a constant interval in the longitudinal direction on both of the outer sides of the center portion; and a fabric covering the whole of the driving surface;

the fabric being stretchable in both the longitudinal and lateral directions of the timing belt.

2. The timing belt for a suction feeder, according to claim 1, further comprising a cord embedded in tooth rubber forming the driving surface, and an intermediate rubber layer provided between the fabric and the cord.

3. The timing belt for a suction feeder, according to claim 1 or 2, wherein the fabric is a woven fabric.

4. The timing belt for a suction feeder, according to claim 1 or 2, wherein a stretch ratio of the fabric is greater than or equal to 35% in the longitudinal direction, and a stretch ratio of the fabric is greater than or equal to 10% in the lateral direction.

5. The timing belt for a suction feeder, according to claim 4, wherein the stretch ratio of the fabric is greater than or equal to 80% in the longitudinal direction, and the stretch ratio of the fabric is greater than or equal to 50% in the lateral direction.

6. The timing belt for a suction feeder, according to claim 1 or 2, wherein the fabric covers the flat surface, a tooth bottom portion formed between two adjacent belt teeth, a tip portion of the belt tooth, a tooth side portion formed between the tip portion and the tooth bottom portion, and a tooth end portion positioned on the flat-surface side of the belt tooth.

7. The timing belt for a suction feeder, according to claim 1 or 2, wherein the flat surface is configured with suction holes, which are drilled at a predetermined interval in the longitudinal direction and penetrate through the conveying surface.

* * * * *